United States Patent
Cseri et al.

(10) Patent No.: US 11,048,716 B1
(45) Date of Patent: Jun. 29, 2021

(54) MANAGED VIRTUAL WAREHOUSES FOR TASKS

(71) Applicant: Snowflake Inc., San Mateo, CA (US)

(72) Inventors: Istvan Cseri, Seattle, WA (US); Qiming Jiang, Redmond, WA (US)

(73) Assignee: Snowflake Inc., San Mateo, CA (US)

( * ) Notice: Subject to any disclaimer, the term of this patent is extended or adjusted under 35 U.S.C. 154(b) by 0 days.

(21) Appl. No.: 16/779,128

(22) Filed: Jan. 31, 2020

(51) Int. Cl.
*G06F 16/25* (2019.01)
*G06N 20/00* (2019.01)
*G06F 9/46* (2006.01)

(52) U.S. Cl.
CPC ............ *G06F 16/254* (2019.01); *G06F 9/466* (2013.01); *G06N 20/00* (2019.01)

(58) Field of Classification Search
CPC ......... G06F 16/24532; G06F 16/24545; G06F 16/2455; G06F 16/24552
See application file for complete search history.

(56) References Cited

U.S. PATENT DOCUMENTS

| | | | | |
|---|---|---|---|---|
| 2015/0237137 A1* | 8/2015 | Dageville | ............. | G06F 9/5083 709/213 |
| 2017/0316078 A1* | 11/2017 | Funke | ................... | G06F 16/283 |
| 2018/0060395 A1* | 3/2018 | Pathak | ................ | G06F 16/2471 |

OTHER PUBLICATIONS

"International Application Serial No. PCT/US2020/070337, International Search Report dated Sep. 9, 2020", 2 pgs.
"International Application Serial No. PCT/US2020/070337, Written Opinion dated Sep. 9, 2020", 7 pgs.

* cited by examiner

*Primary Examiner* — Taelor Kim
(74) *Attorney, Agent, or Firm* — Schwegman Lundberg & Woessner, P.A.

(57) ABSTRACT

The subject technology receives a task for executing in a network-based data warehouse system. The subject technology determines a number of execution nodes to execute the task. The subject technology, based on the number of execution nodes, selects a virtual warehouse that includes at least the number of execution nodes. The subject technology sends the task to the virtual warehouse for execution. The subject technology receives an indication that execution of the task is complete. Further, the subject technology provides an indication that the virtual warehouse is idle.

26 Claims, 9 Drawing Sheets

US 11,048,716 B1

MANAGED VIRTUAL WAREHOUSES FOR TASKS

TECHNICAL FIELD

Embodiments of the disclosure relate generally to databases and, more specifically, to resource management related to performing tasks in conjunction with such databases.

BACKGROUND

Databases are an organized collection of data that enable data to be easily accessed, manipulated, and updated. Databases serve as a method of storing, managing, and retrieving information in an efficient manner. Traditional database management requires companies to provision infrastructure and resources to manage the database in a data center. Management of a traditional database can be very costly and requires oversight by multiple persons having a wide range of technical skill sets.

Databases are widely used for data storage and access in computing applications. A goal of database storage is to provide enormous sums of information in an organized manner so that it can be accessed, managed, and updated.

Traditional relational database management systems (RDMS) require extensive computing and storage resources and have limited scalability. Large sums of data may be stored across multiple computing devices. A server may manage the data such that it is accessible to customers with on-premises operations. For an entity that wishes to have an in-house database server, the entity must expend significant resources on a capital investment in hardware and infrastructure for the database, along with significant physical space for storing the database infrastructure. Further, the database may be highly susceptible to data loss during a power outage or other disaster situations. Such traditional database systems have significant drawbacks that may be alleviated by a cloud-based database system.

A cloud database system (also referred to as a cloud data warehouse, a "network-based data warehouse" or simply as a "data warehouse") may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

When certain information is to be extracted from a database, a query statement may be executed against the database data. A network-based data warehouse system processes the query and returns certain data according to one or more query predicates that indicate what information should be returned by the query. The data warehouse system extracts specific data from the database and formats that data into a readable form.

Queries can be executed against database data to find certain data within the database. A database query extracts data from the database and formats it into a readable form. For example, when a user wants data from a database, the user may write a query in a query language supported by the database. The query may request specific information from the database. The query may request any pertinent information that is stored within the database. If the appropriate data can be found to respond to the query, the database has the potential to reveal complex trends and activities.

BRIEF DESCRIPTION OF THE DRAWINGS

The present disclosure will be understood more fully from the detailed description given below and from the accompanying drawings of various embodiments of the disclosure.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The systems, methods, and devices described herein provide embodiments for scheduling and executing tasks on shared storage and execution platforms. The systems, methods, and devices described herein may be implemented on network-based database platforms. Further, the implementations described herein enable queries to be executed on behalf of a client account.

In embodiments described herein, a task warehouse manager, as included as a component of a compute service manager, schedules and manages the execution of a job, which can include one or more discrete tasks performed in a network-based data warehouse system. The task warehouse manager may schedule and manage the execution of such tasks, by utilizing a task warehouse pool, while leveraging knowledge derived from a history of executions of prior tasks to appropriately assign a virtual warehouse, with sufficient resources, suitable to execute current tasks. It should be appreciated that the task warehouse manager may manage the execution of any number of tasks or type of tasks.

In existing network-based data warehouse systems, when users create a task (e.g., query statement for executing on databases provided by the network-based data warehouse system), the user also has to specify an existing virtual warehouse. As discussed below, a virtual warehouse includes multiple execution nodes that each include a cache and a processor.

The subject system, as described herein, advantageously enables the automation of virtual warehouse management thereby decoupling a requirement for a user to specify particular virtual warehouse requirements to execute a sets of task in a given job. In this manner, the subject system can reduce costs and optimize query execution for tasks. Further, as described further herein, the subject system advantageously utilizes an execution history of prior tasks to more intelligently understand virtual warehouse usage and performance metrics in order to optimize the execution of current and/or future tasks. In this manner, the subject system improves the performance of a computing system (e.g., the subject system) by reducing computing resources (e.g., processor, memory, cache) that are utilized to execute tasks.

Figure 1A:
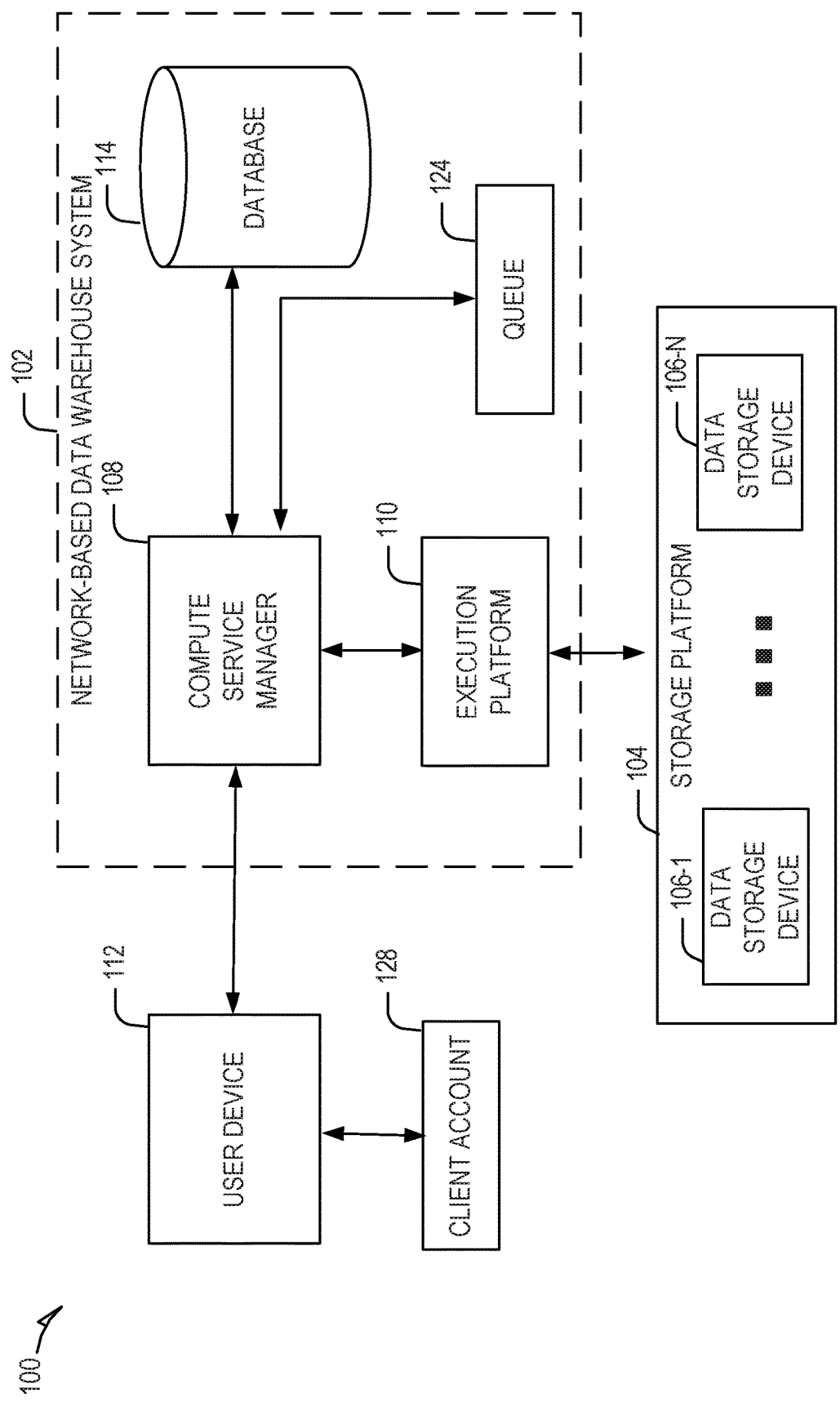
FIG. 1A illustrates an example computing environment that includes a network-based data warehouse system in communication with a storage platform, in accordance with some embodiments of the present disclosure.

FIG. 1A illustrates an example computing environment 100 that includes a network-based data warehouse system 102 in communication with a storage platform 104, in accordance with some embodiments of the present disclosure. To avoid obscuring the inventive subject matter with unnecessary detail, various functional components that are not germane to conveying an understanding of the inventive subject matter have been omitted from FIG. 1A. However, a skilled artisan will readily recognize that various additional functional components may be included as part of the computing environment 100 to facilitate additional functionality that is not specifically described herein.

In some embodiments, the network-based data warehouse system 102 includes a compute service manager 108, which is in communication with a queue 124, a client account 128, database 114, and an execution platform 110. In an embodiment, the compute service manager 108 does not receive any direct communications from a client account 128 and only receives communications concerning jobs from the queue 124. In particular implementations, the compute service manager 108 can support any number of client accounts 128 such as end users corresponding to respective one or more of user device 112 that provide data storage and retrieval requests, system administrators managing the systems and methods described herein, and other components/devices that interact with compute service manager 108. As used herein, compute service manager 108 may also be referred to as a "global services system" that performs various functions as discussed herein.

As shown, the computing environment 100 comprises the network-based data warehouse system 102 and a storage platform 104 (e.g., AWS®, Microsoft Azure Blob Storage®, or Google Cloud Storage®). The network-based data warehouse system 102 is used for accessing and/or processing integrated data from one or more disparate sources including data storage devices 106-1 to 106-N within the storage platform 104. The storage platform 104 comprises a plurality of computing machines and provides on-demand computer system resources such as data storage and computing power to the network-based data warehouse system 102.

The network-based data warehouse system 102 comprises a compute service manager 108, an execution platform 110, and a database 114. The network-based data warehouse system 102 hosts and provides database services to multiple client accounts. Administrative users can create and manage identities (e.g., users, roles, and groups) and use permissions to allow or deny access to the identities to resources and services.

The compute service manager 108 coordinates and manages operations of the network-based data warehouse system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a user device 112. The user device 112 corresponds to a user of one of the multiple client accounts supported by the network-based data-warehouse system 102. As shown, the user is associated with a client account 128. In some embodiments, the compute service manager 108 does not receive any direct communications from the user device 112 and only receives communications concerning jobs from a queue 124 within the network-based data warehouse system 102.

The compute service manager 108 is also coupled to database 114, which is associated with the data stored the computing environment 100. The database 114 stores data pertaining to various functions and aspects associated with the network-based data warehouse system 102 and its users. In some embodiments, the database 114 includes a summary of data stored in remote data storage systems as well as data available from a local cache. Additionally, the database 114 may include information regarding how data is organized in remote data storage systems (e.g., the storage platform 104) and the local caches. The database 114 allows systems and services to determine whether a piece of data needs to be accessed without loading or accessing the actual data from a storage device.

In some embodiments, the compute service manager 108 may determine that a job should be performed based on data from the database 114. In such embodiments, the compute service manager 108 may scan the data and determine that a job should be performed to improve data organization or database performance. For example, the compute service manager 108 may determine that a new version of a source table has been generated and the pruning index has not been refreshed to reflect the new version of the source table. The database 114 may include a transactional change tracking stream indicating when the new version of the source table was generated and when the pruning index was last refreshed. Based on that transaction stream, the compute service manager 108 may determine that a job should be performed. In some embodiments, the compute service manager 108 determines that a job should be performed based on a trigger event and stores the job in a queue until the compute service manager 108 is ready to schedule and manage the execution of the job. In an embodiment of the disclosure, the compute service manager 108 determines whether a table or pruning index needs to be reclustered based on one or more DML commands being performed, wherein one or more of DML commands constitute the trigger event.

The compute service manager 108 may receive rules or parameters from the client account 128 and such rules or parameters may guide the compute service manager 108 in scheduling and managing internal jobs. The client account 128 may indicate that internal jobs should only be executed at certain times or should only utilize a set maximum amount of processing resources. The client account 128 may further indicate one or more trigger events that should prompt the compute service manager 108 to determine that a job should be performed. The client account 128 may provide parameters concerning how many times a task may be re-executed and/or when the task should be re-executed.

The compute service manager 108 is in communication with a queue 124. In an embodiment, the compute service manager 108 does not receive any direct communications from a client account 128 and only receives communications concerning jobs from the queue 124. In particular implementations, the compute service manager 108 can support any number of client accounts 128 such as end users providing data storage and retrieval requests, system administrators managing the systems and methods described herein, and other components/devices that interact with compute service manager 108.

The queue 124 may provide a job to the compute service manager 108. One or more jobs may be stored in the queue 124 in an order of receipt and/or an order of priority, and each of those one or more jobs may be communicated to the compute service manager 108 to be scheduled and executed.

In an implementation, the queue 124 may determine a job to be performed based on a trigger event such as the ingestion of data, deleting one or more rows in a table, updating one or more rows in a table, a materialized view becoming stale with respect to its source table, a table reaching a predefined clustering threshold indicating the table should be reclustered, and so forth.

The queue 124 may determine internal jobs that should be performed to improve the performance of the database and/or to improve the organization of database data. In an embodiment, the queue 124 does not store queries to be executed for a client account but instead only includes stores database jobs that improve database performance.

The compute service manager 108 is further coupled to the execution platform 110, which provides multiple computing resources that execute various data storage and data retrieval tasks. The execution platform 110 is coupled to storage platform 104 of the storage platform 104. The storage platform 104 comprises multiple data storage devices 106-1 to 106-N. In some embodiments, the data storage devices 106-1 to 106-N are cloud-based storage devices located in one or more geographic locations. For example, the data storage devices 106-1 to 106-N may be part of a public cloud infrastructure or a private cloud infrastructure. The data storage devices 106-1 to 106-N may be hard disk drives (HDDs), solid state drives (SSDs), storage clusters, Amazon S3TM storage systems or any other data storage technology. Additionally, the storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan, a second process to monitor and delete micro-partition files using a least recently used (LRU) policy and implement an out of memory (OOM) error mitigation process, a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1A, the data storage devices 106-1 to 106-N are decoupled from the computing resources associated with the execution platform 110. This architecture supports dynamic changes to the network-based data warehouse system 102 based on the changing data storage/retrieval needs as well as the changing needs of the users and systems. The support of dynamic changes allows the network-based data warehouse system 102 to scale quickly in response to changing demands on the systems and components within the network-based data warehouse system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 108, database 114, execution platform 110, and storage platform 104 are shown in FIG. 1A as individual discrete components. However, each of the compute service manager 108, database 114, execution platform 110, and storage platform 104 may be implemented as a distributed system (e.g., distributed across multiple systems/platforms at multiple geographic locations). Additionally, each of the compute service manager 108, database 114, execution platform 110, and storage platform 104 can be scaled up or down (independently of one another) depending on changes to the requests received and the changing needs of the network-based data warehouse system 102. Thus, in the described embodiments, the network-based data warehouse system 102 is dynamic and supports regular changes to meet the current data processing needs.

During typical operation, the network-based data warehouse system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the database 114 assists the compute service manager 108 in determining which nodes in the execution platform 110 have already cached at least a portion of the data needed to process the task. One or more nodes in the execution platform 110 process the task using data cached by the nodes and, if necessary, data retrieved from the storage platform 104. It is desirable to retrieve as much data as possible from caches within the execution platform 110 because the retrieval speed is typically much faster than retrieving data from the storage platform 104.

As shown in FIG. 1A, the computing environment 100 separates the execution platform 110 from the storage platform 104. In this arrangement, the processing resources and cache resources in the execution platform 110 operate independently of the data storage devices 106-1 to 106-N in the storage platform 104. Thus, the computing resources and cache resources are not restricted to specific data storage devices 106-1 to 106-N. Instead, all computing resources and all cache resources may retrieve data from, and store data to, any of the data storage resources in the storage platform 104.

Figure 1B:
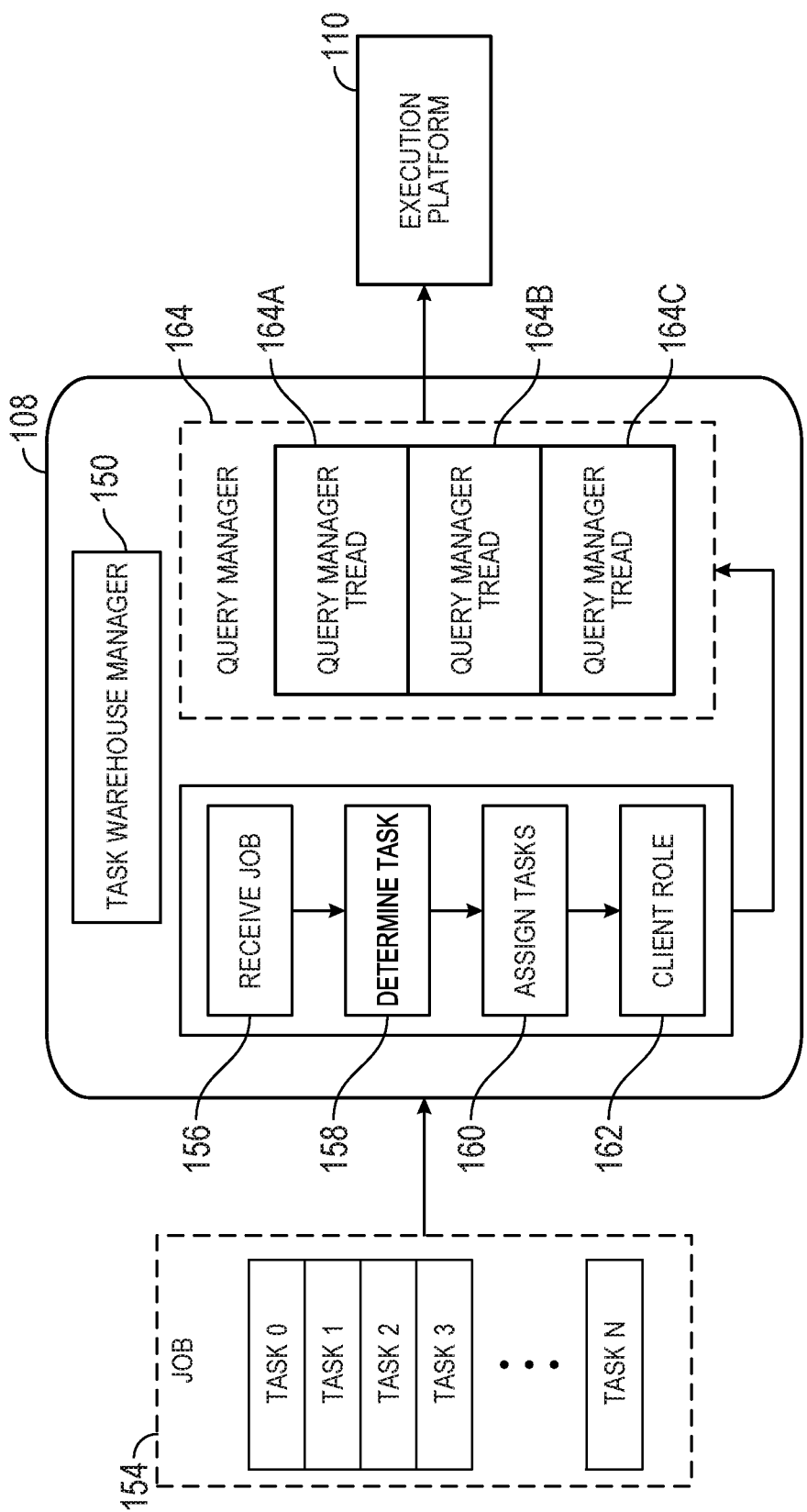
FIG. 1B is a block diagram of a process flow for managing and executing jobs on a database system (e.g., the network-based data warehouse system), in accordance with some embodiments of the present disclosure.

FIG. 1B is a block diagram of an example embodiment of a process flow for managing and executing jobs on a database system (e.g., the network-based data warehouse system 102). In an embodiment, the process flow is carried out by a task warehouse manager ISO that is configured to manage and execute jobs on a data processing platform as described further herein.

As shown, the task warehouse manager 150 is included in the compute service manager 108. The task warehouse manager 150 receives a job 154 that may be divided into one or more discrete tasks, e.g. task 0, task 1, task 2, task 3, and so forth through task (n). The task warehouse manager 150 receives the job at 156 and determines tasks at 158 that may be carried out to execute the job 154. The task warehouse manager 150 is configured to determine the one or more discrete tasks, such as task 0, task 1, task 2, task 3, and so forth, based on applicable rules and/or parameters. The task warehouse manager 150 assigns tasks at 160. In an implementation, the task warehouse manager 150 may assume a client role at 112 to act on client data.

In an implementation, the job 154 is carried out by a query manager 164, which may be another component of the compute service manager 108. As shown, the query manager 164 may have multiple threads, including, for example, query manager threads 164a, 164b, 164c, and so forth. The task warehouse manager 150 may assign the job 154, including the multiple discrete tasks, to a particular virtual warehouse of the execution platform 110. Based on this assignment, the query manager 164 can send the job 154, including the multiple discrete tasks, to the assigned virtual warehouse for execution. As discussed further below in FIG. 4 and FIG. 5, the task warehouse manager 150 may generate and manage a pool of virtual warehouses, provided by the execution platform 110, for selecting a particular virtual warehouse to execute a given job, in which each virtual warehouse includes a various number of execution nodes to execute the given job.

As mentioned before, the task warehouse manager 150 determines one or more discrete tasks to be executed to execute the job 154. A task is a portion of work that may be scheduled for execution by the execution platform 110. The job 154 may include a state that can be serialized for storage, a mechanism to deserialize that state, and a set of methods that operate based on that state to produce the one or more discrete tasks and make decisions concerning how to deal with, for example, errors, failures, state transitions, and so forth. The state may reside in persistent storage and may be updated to reflect a job that is executed by the task warehouse manager 150.

In an embodiment, the task warehouse manager 150 schedules and manages the execution of queries on behalf of a client account (e.g., the client account 128). The task warehouse manager 150 may schedule any arbitrary SQL query. The task warehouse manager 150 may assume a role to schedule the job 154 as if it is the client account rather than as an internal account or other special account. The task warehouse manager 150 may embody the role of, for example, an account administrator or a role having the smallest scope necessary to complete the intended job 154. In an embodiment, the task warehouse manager 150 embodies the role that owns the object that is the target of the job 154, e.g. for a cluster, the table being clustered. In an embodiment, the task warehouse manager 150 receives the job 154 and the job 154 specifies a domain or identification of the object that will be operated on. From that domain or identification, the task warehouse manager 150 resolves the object and assumes the appropriate role identification. In an embodiment, the task warehouse manager 150 assumes a role of a special "compute service user" that is not visible to or usable by a client account.

In an embodiment, the task warehouse manager 150 determines tasks at 158 and assigns tasks at 160. The task warehouse manager 150 generates one or more discrete units of work that may be referred to as a task. The task includes, for example, a task type, a task identification, an account identification, a payload which may be converted to one or more discrete tasks, and a set of options that control how the job 154 behaves (e.g. indicates a number of retries). The task includes a "state" that identifies where in the task lifecycle a given task is. The persistent state for a task may be split between values that are hard coded into persistent data storage and a task implementation-specific object that is deserialized when operating on the task object in memory. This may permit the task persistent data storage to be relatively simple when permitting individual implementers to store arbitrary information about their associated tasks. The task namespace includes an index class that groups information for concrete implementations of a scheduled task, including a class object for the concrete implementation, an object domain for the task, and any other information that is pertinent to the task type.

In an embodiment, the task warehouse manager 150 generates and assign a task continuation and/or a child task.

In certain implementations, a task may require multiple iterations before converging to a completed state. In such an implementation, a task may only be a portion of a larger piece of work that requires running many such tasks serially to be completed. This may be accommodated by generating successor tasks that are initiated when a task is successfully completed.

In an embodiment, the job 154 is fail-safe and has a life cycle that begins when the one or more discrete tasks are scheduled to be executed and/or assigned to the execution platform 110. In an embodiment, the one or more discrete tasks may be scheduled via an application program interface (API).

In an embodiment, the task warehouse manager 150 receives a job at 156 by way of an internal mechanism, and the job 154 is not received directly from a client account. In an alternative embodiment, the job 154 is received directly from a client account. Where the job 154 is determined and received by way of an internal mechanism, the job 154 may include a "behind the scenes" operation that improves the management or organization of database data. Such internal jobs include, for example, clustering or reclustering database data, refreshing a materialized view based on an updated source table, compacting one or more database tables or micro-partitions, executing a storage procedure service, and upgrading files or micro-partitions in database table.

Further, the task warehouse manager 150 may receive such a job at 156 based on a trigger event. In an example implementation, where the task warehouse manager 150 receives a job to refresh a materialized view, the trigger event may be the updating or refreshing of the source table for the materialized view. In an additional example implementation, where the task warehouse manager 150 receives a job to recluster database data, the trigger event may be that a table has fallen below a predefined clustering threshold or that new data is ingested into a database table. In an implementation, the task warehouse manager 150 schedules and manages internal jobs that improve database operations, database organization, and database query performance, and does not schedule or manage the execution of a query (such as a SQL statement) that is received from a user or client account.

The task warehouse manager 150 is configured to determine one or more discrete tasks at 158 that must be performed to fully execute the job 154. In an embodiment, the one or more discrete tasks do not have any ordering constraints and may be executed in parallel or in any other order. In another embodiment, the task warehouse manager 150 assigns ordering constraints to any number of the one or more discrete tasks, where applicable. Depending on the constraints of the job 154, the task warehouse manager 150 may determine that one or more of multiple discrete tasks must be serialized and executed in a particular order.

In an embodiment, the task warehouse manager 150 generates a report indicating when the job 154 is scheduled to be executed and how much computing resources are estimated to be tied up executing the job 154. The task warehouse manager 150 may generate a statement for each task that exposes the job 154 to an applicable client account by way of a filter. The task warehouse manager 150 may alert a client account when the job 154 is being executed particularly where the job 154 uses a customer-managed key.

Figure 2:
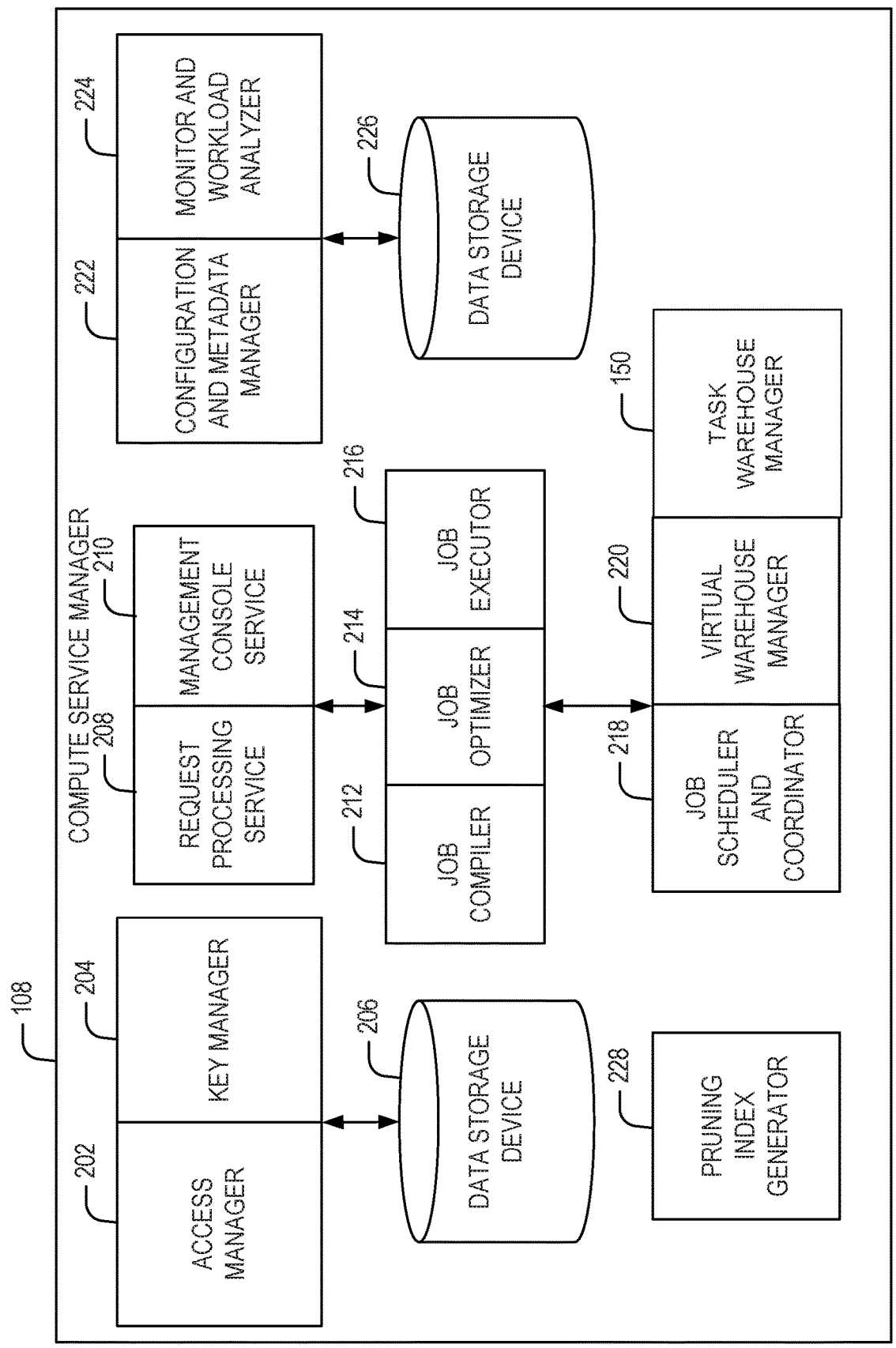
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in storage platform 104). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based data warehouse system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represent any data storage device within the network-based data warehouse system 102. For example, data storage device 226 may represent caches in execution platform 110, storage devices in storage platform 104, or any other storage device.

As shown, the compute service manager 108 further includes a pruning index generator 228. The pruning index generator 228 is responsible for generating pruning indexes to be used in pruning scan sets for queries directed to tables stored in the storage platform 104.

Figure 3:
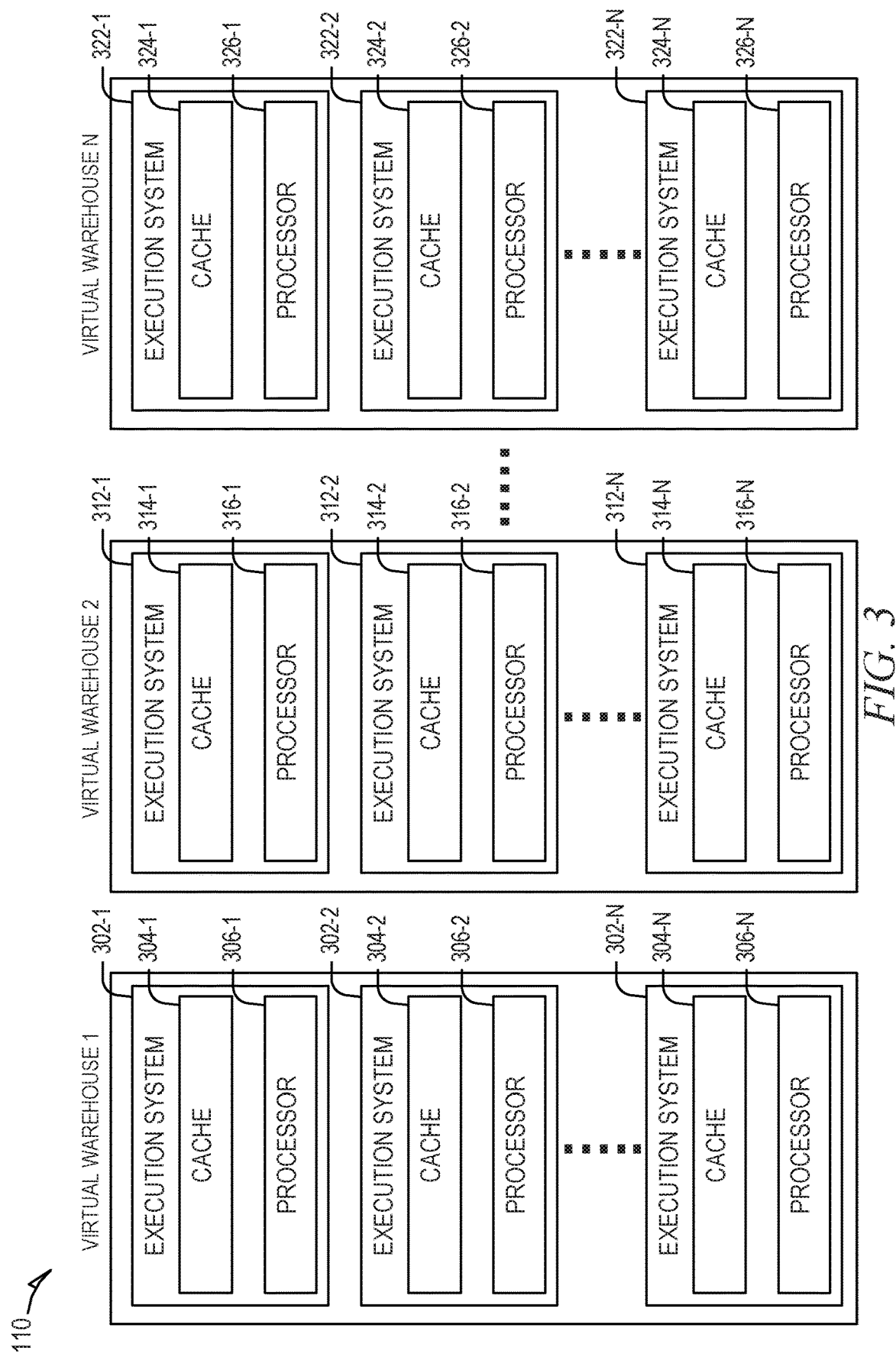
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 106-1 to 106-N shown in FIG. 1A. Thus, the virtual warehouses are not necessarily assigned to a specific data storage device 124-1 to 124-n and, instead, can access data from any of the data storage devices 106-1 to 106-N within the storage platform 104. Similarly, each of the execution nodes shown in FIG. 3 can access data from any of the data storage devices 106-1 to 106-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
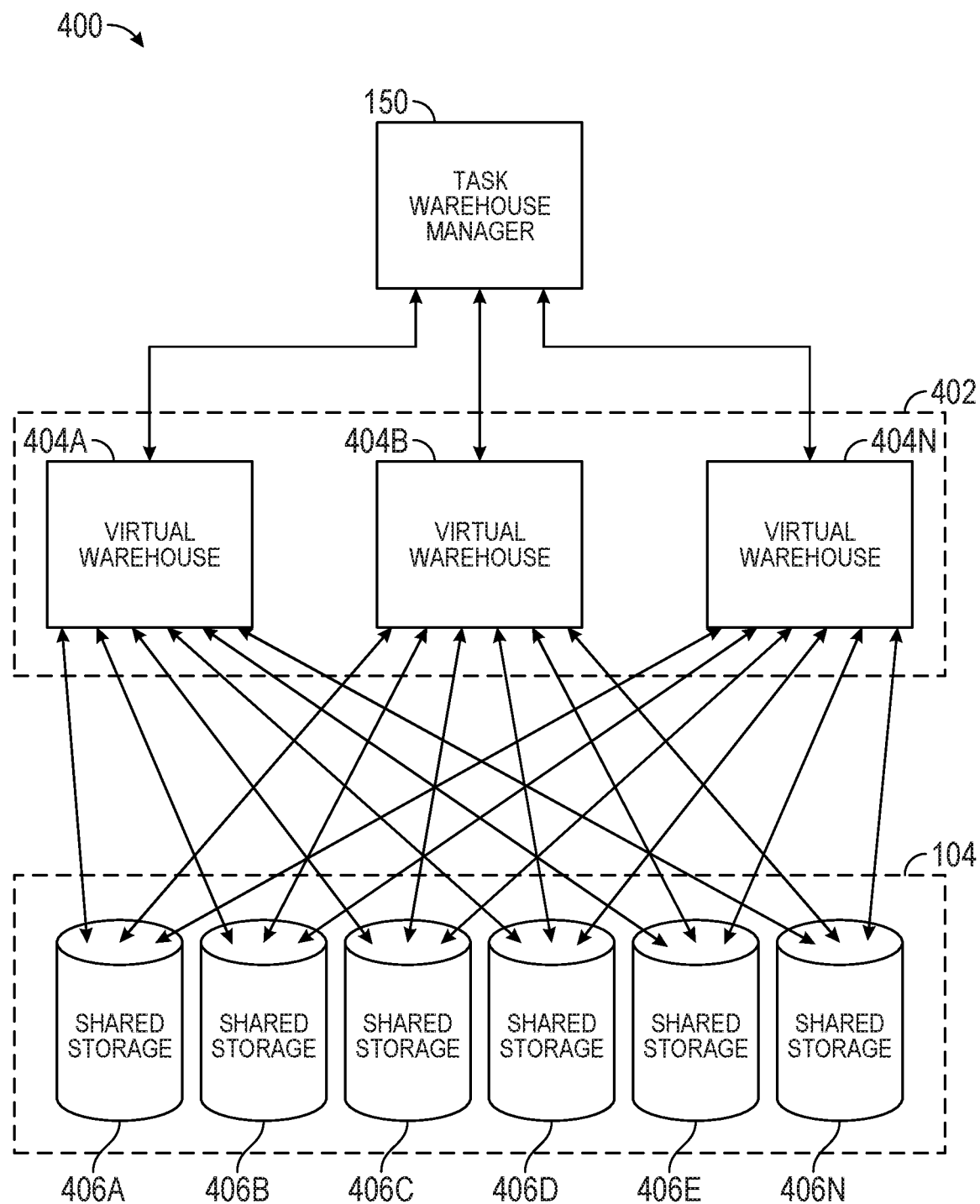
FIG. 4 is a block diagram depicting an example computing environment with a task warehouse manager in communication with multiple virtual warehouses from a task warehouse pool, in accordance with some embodiments of the present disclosure.

FIG. 4 is a block diagram depicting an example computing environment 400 with the task warehouse manager 150 in communication with multiple virtual warehouses from a task warehouse pool 402. In computing environment 400, the task warehouse manager 150 has access to shared storage devices 406a, 406b, 406c, 406d, 406e and 406n through virtual warehouses 404a, 404b, and 404n. In particular embodiments, shared storage devices 406a-406n are contained in the storage platform 104 and are accessible by any virtual warehouse implemented in the execution platform 110. In some embodiments, the task warehouse manager 150 may access one of the virtual warehouses 404a-404n using a data communication network such as the Internet. In some implementations, a client account may specify that the task warehouse manager 150 (configured for storing internal jobs to be completed) should interact with a particular virtual warehouse 404a-404n at a particular time.

In an embodiment (as illustrated), each virtual warehouse 404a-404n can communicate with all shared storage devices 406a-406n. In some embodiments, each virtual warehouse 404a-404n is configured to communicate with a subset of all shared storage devices 406a-406n. In such an arrangement, an individual client account associated with a set of data may send all data retrieval and data storage requests through a single virtual warehouse and/or to a certain subset of the shared storage devices 406a-406n. Further, where a certain virtual warehouse 404a-404n is configured to communicate with a specific subset of shared storage devices 406a-406n, the configuration is dynamic. For example, virtual warehouse 404a may be configured to communicate with a first subset of shared storage devices 406a-406n and may later be reconfigured to communicate with a second subset of shared storage devices 406a-406n.

In an embodiment, the task warehouse manager 150 receives data retrieval, data storage, and data processing requests. In response to such requests, the task warehouse manager 150 utilizes the task warehouse pool 402 in order to route the requests to an appropriate virtual warehouse 404a-404n. In some implementations, the task warehouse pool 402 provides a dynamic assignment of jobs to one of the virtual warehouses 404a-404n from the task warehouse pool 402, which is discussed in further detail in FIG. 5 below.

In some embodiments, fault tolerance systems create a new virtual warehouse in response to a failure of a virtual warehouse. The new virtual warehouse may be in the same virtual warehouse group or may be created in a different virtual warehouse group at a different geographic location.

The systems and methods described herein allow data to be stored and accessed as a service that is separate from computing (or processing) resources. Even if no computing resources have been allocated from the execution platform 110, data is available to a virtual warehouse without requiring reloading of the data from a remote data source. Thus, data is available independently of the allocation of computing resources associated with the data. The described systems and methods are useful with any type of data. In particular embodiments, data is stored in a structured, optimized format. The decoupling of the data storage/access service from the computing services also simplifies the sharing of data among different users and groups. As discussed herein, each virtual warehouse can access any data to which it has access permissions, even at the same time as other virtual warehouses are accessing the same data. This architecture supports running queries without any actual data stored in the local cache. The systems and methods described herein are capable of transparent dynamic data movement, which moves data from a remote storage device to a local cache, as needed, in a manner that is transparent to the user of the system. Further, this architecture supports data sharing without prior data movement since any virtual warehouse can access any data due to the decoupling of the data storage service from the computing service.

Figure 5:
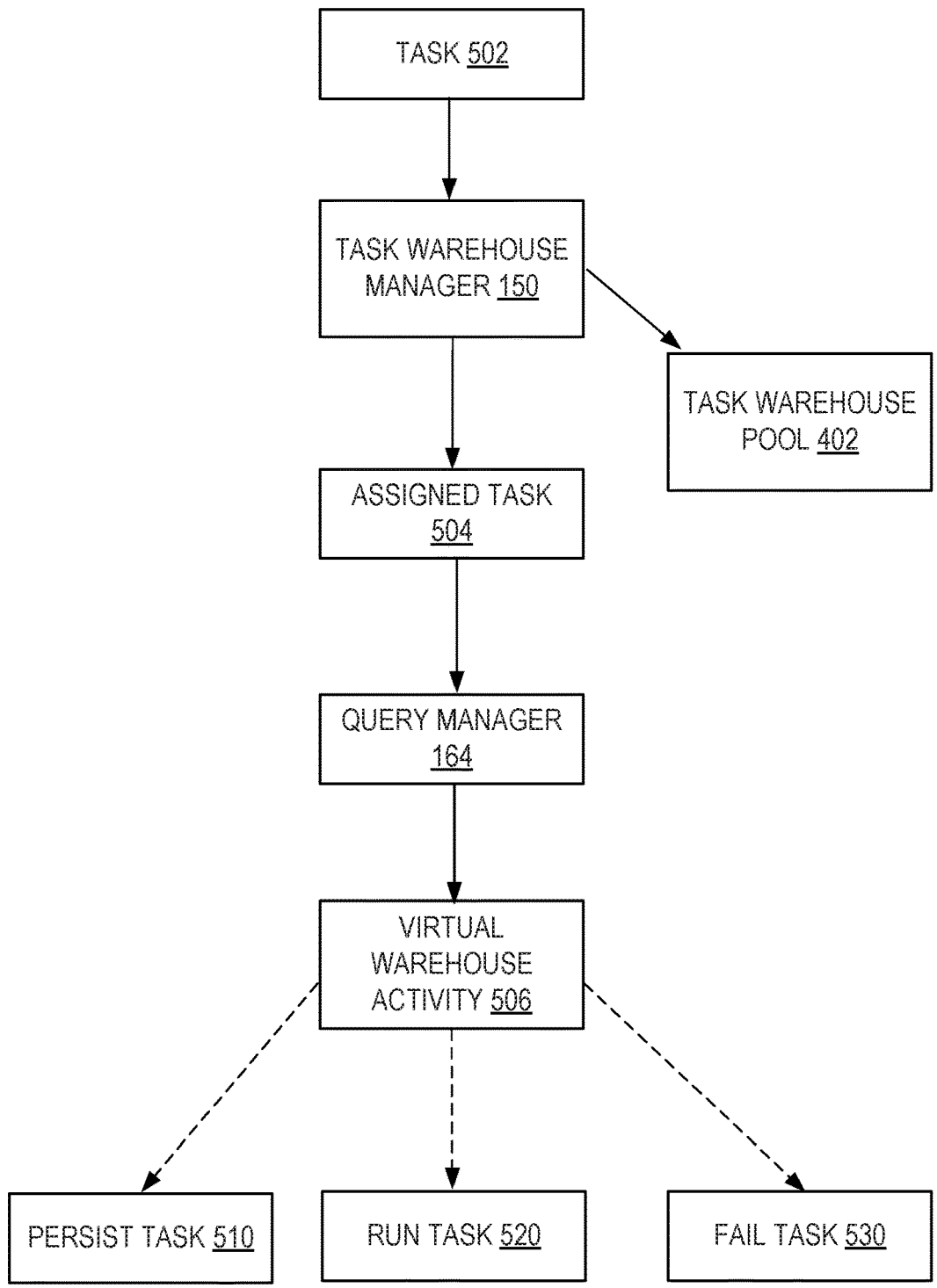
FIG. 5 conceptually illustrates a process flow for executing a task, utilizing the task warehouse manager and the task warehouse pool, in the network-based data warehouse system, in accordance with some embodiments of the present disclosure.

FIG. 5 conceptually illustrates an example embodiment of a process flow 500 for executing a task, utilizing the task warehouse manager 150 and the task warehouse pool 402, in the network-based data warehouse system 102. In an embodiment, the process flow is carried out by the task warehouse manager 150 in conjunction with the task warehouse pool 402, and the query manager 164.

As illustrated, a task 502 is received by the task warehouse manager 150. In an example, the task 502 is included in the queue 124, which is accessible to the task warehouse manager 150. As mentioned before, the task warehouse manager 150, using applicable rules and/or parameters, may divide a job into one or more discrete tasks, e.g. task 0, task 1, task 2, task 3, and so forth through task (n). In this example, the task 502 may be a discrete task from a given job.

The task warehouse manager 150 creates and manages the task warehouse pool 402. In an implementation, the task warehouse pool is associated with a given client account (e.g., the client account 128), and includes a set of virtual warehouses with different numbers of execution nodes for executing tasks.

In an embodiment, the task warehouse manager 150 generates the task warehouse pool 402 when a task is about to execute (e.g., after receiving the task 502). If the task warehouse manager 150 determines that no virtual warehouse is available that matches the expected size to execute the task, the task warehouse manager 150 creates a virtual warehouse accordingly (e.g., with the expected size of execution nodes). When the task is complete, the virtual warehouse becomes idle and is returned to the task warehouse pool 402. Moreover, the task warehouse manager 150 periodically checks the task warehouse pool 402 and makes a determination when to suspend/shutdown some of the virtual warehouses in the task warehouse pool 402.

As discussed further herein, the task warehouse manager 150 utilizes a history of prior executions of a particular number of tasks to determine a size (e.g., number of execution nodes) of a virtual warehouse for executing the task 502. In an example, the task warehouse manager 150, in a first run (e.g., no history of prior executions), assigns a virtual warehouse with a default size and/or assigns a virtual warehouse based on a user specified hint.

After a history of prior executions has been established after at least an X number of prior executions of prior tasks, the task warehouse manager 150 can analyze the history to determine a size of a virtual warehouse for executing the task 502. In an example, for each prior execution of a previous task from the X number of prior executions, if an execution time (e.g., a total runtime to complete a prior task) is greater than a particular percentage (e.g., 50%) of a task interval, and from prior executions of previous tasks it is determined that increasing the size of execution nodes can reduce the execution time, then the task warehouse manager 150 increments a vote count for a larger size of a virtual warehouse to execute the task 502. In an example, a maximum size of a virtual warehouse (e.g., a capped size) is known to the task warehouse manager 150, such that if the aforementioned larger size is greater than the maximum size, the task warehouse manager 150 does not vote for this larger size and/or votes for a size equal to the maximum size. Alternatively, for each prior execution from the X number of prior executions, if an execution time is less than a second particular percentage (e.g., 25%) of the task interval, the task warehouse manager 150 increments a vote count for a smaller size of a virtual warehouse to execute the task. Otherwise, for each prior execution from the X number of prior executions, the task warehouse manager 150 increments a vote count of current size of the virtual warehouse that is to execute the task. In an example, the current size of the virtual warehouse could be a default size (e.g., as discussed before when no virtual warehouse exists or during an initial run), or could be based on the size of the virtual warehouse from the immediate previous execution of a prior task. In some embodiments, other signals are utilized to determine the vote. For example, if it is determined from prior executions that a specific task does not benefit from parallel execution, then the task warehouse manager 150 increments a vote count for a smaller warehouse. For example, from a prior execution, it can be determined whether a given task is too large to fit in memory, which can result in a "spill" of intermediate results to local or remote storage. In a case where such a spill is detected, the task warehouse manager 150 increments a vote count for a larger warehouse.

The task warehouse manager 150 selects a particular virtual warehouse from the task warehouse pool 402 to execute the task 502 based on a "winner" of the votes from the last X number of prior executions of tasks (e.g., the particular virtual warehouse with the most number of votes). As mentioned herein, a "task interval" refers to a period of time, which is adjustable by the task warehouse manager 150, that is utilized as a window of time for monitoring whether a task is executed, and for determining how much (e.g., percentage-wise) of that task interval that such a task is executed to completion. In an embodiment, the task warehouse manager 150 selects the particular virtual warehouse from the task warehouse pool 402 utilizing at least one or more of the following: 1) only consider virtual warehouses with an exact same size as required, 2) only consider virtual warehouses which are not fully loaded, 3) favor "resumed" virtual warehouses over "suspended" virtual warehouses, and 4) favor warehouses with lighter workload on it.

In an embodiment, the task warehouse manager 150 can utilize a machine learning model, such as a deep neural network (DNN) model to predict a size of a virtual warehouse, which can then be utilized to select an appropriate virtual warehouse to assign for performing the task. In an example, the DNN model can be trained based on data of prior executions of tasks that are stored, in an implementation, in the storage platform 104. Such training data can include execution times of tasks, corresponding sizes of virtual warehouses executing such tasks, and/or other metrics with respect to computing resources that were utilized (e.g., CPU time, CPU load, network load, network utilization, memory usage, other storage usage, and the like). The DNN model can receive, as inputs, information related to the task to be executed, the history of prior executions of a particular number of tasks, whether the task does not benefit from parallel execution, and/or whether the task is too large to fit in memory and could result in a spill of intermediate results to local or remote storage. It is appreciated that other types of inputs and/or training data can be provided to the DNN model. In an example, the DNN model can multiple each of the inputs by a corresponding weight, and for each subsequent layer (e.g., one or more hidden layers) of the DNN model, apply an activation function on the inputs from the previous layer to provide an output(s) (which serves as an input to the next layer), and, after reaching an output layer, perform a final set of operations that provides a predicted size of a virtual warehouse for performing the task as an output of the DNN model. In this manner, the DNN model, using such inputs, predicts, as an output, a size of a virtual warehouse to perform the task. The task warehouse manager 150, using this output, can determine to increment a vote count (e.g., a score) of a particular size of virtual warehouse to assign to perform the task.

As shown, after selecting the particular virtual warehouse, an assigned task 504 is sent to the query manager 164. As discussed before, the query manager 164 can send the job 154, including the multiple discrete tasks, to the assigned virtual warehouse for execution on the execution platform 110.

In an embodiment, information corresponding to a history votes for various size of virtual warehouse and/or task metadata are stored in the storage platform 104. Further, such information may be cached in memory for faster access.

The query manager 164 and initiate virtual warehouse activity 506 on the selected virtual warehouse to execute the assigned task 504. If the selected virtual warehouse has been suspended, the assigned task 504 is persisted at step 510. If the selected virtual warehouse is available (e.g., idle), the assigned task 504 is run at step 520. If the selected virtual warehouse no longer exists (e.g., removed from the task warehouse pool 402), the assigned task 504 is failed at step 530.

As mentioned above, in some instances, a particular virtual warehouse may have been suspended prior to executing a task (but after receiving the task and selecting the particular virtual warehouse). Such scenarios may occur in response to the task warehouse manager 150 actively suspending one or more virtual warehouses in view of upcoming tasks in the queue 124. It is appreciated that, in an example, a selected virtual warehouse exists in the task warehouse pool 402 but can be currently in a suspended state. In another embodiment, a particular virtual warehouse may be dropped, but the task warehouse manager 150 is configured to only do so in such an instance if dropping the virtual warehouse does not interfere with existing tasks. In an embodiment, the task warehouse manager 150 scans the queue 124 and determines a number of future tasks that will run in the next task interval. Based on the determined future tasks, the task warehouse manager 150 determines a number of virtual warehouses and the respective sizes of these virtual warehouses in order to execute the future tasks. The task warehouse manager 150 analyzes the task warehouse pool 402 to determine whether any virtual warehouses are currently idle (e.g., not executing a task at the time being). For such idle warehouses, if some are determined not to be utilized in the next task interval, task warehouse manager 150 suspends the idle warehouses. Further, if a particular virtual warehouse is suspended for longer than a threshold period of time, the task warehouse manager 150 removes the virtual warehouse from the task warehouse pool 402.

In view of the above discussion, stated in another way, immediately after the task has completed, the task warehouse manager 150 determines a second task in the queue based at least in part on a time interval, the time interval corresponding to a subsequent time window for executing a set of tasks. The task warehouse manager 150 determines that the second task can also be executed by a second virtual warehouse that is currently idle, and decides to not suspend the second virtual warehouse. Additionally, the task warehouse manager 150 determines that the second task is unable to be executed by a third virtual warehouse that is currently idle, and the task warehouse manager 150 suspends the third virtual warehouse.

In an embodiment, the task warehouse manager 150 may utilize at least some of the following parameters in order determine a size of a virtual warehouse to execute a given task/job. At least some of the following parameters are configurable by the network-based data warehouse system 102.

ENABLE_TASK_AUTO_MANAGED_WAREHOUSES
  Whether the feature is enabled on this client account.
USER_TASK_MANAGED_MAX_WAREHOUSES
  Max number of managed virtual warehouses per size that can be created.
USER_TASK_MANAGED_WAREHOUSES_ENABLED_TASK
  Whether a specific task is enabled for managed virtual warehouses.
TASK_AUTO_MANAGED_LOOK_AHEAD_WINDOW
  An amount of time of a time window to gather upcoming tasks/jobs. Assuming: tasks/jobs cannot run in the same virtual warehouse in the time window, and one virtual warehouse is assigned per task/job.
TASK_AUTO_MANAGED_PREDICT_ON_LAST_N_RUNS
  How many past tasks/jobs to look at to determine the size of the virtual warehouse for the next task/job.
TASK_AUTO_MANAGED_LOW_THRESHOLD_PERCENT
  If the job runs less than this percent of a task interval, a vote is counted to reduce the size of the virtual warehouse (e.g., a number of execution nodes). This is a mechanism to help ensure that while a task/job can finishes within the task interval, the smallest warehouse is utilized to save computing cost.
TASK_AUTO_MANAGED_HIGH_THRESHOLD_PERCENT
  If the task/job runs more than this percent of a task interval, a vote is counted to increase the size of the warehouse.
TASK_AUTO_MANAGED_MAX_WAREHOUSE_SIZE
  The maximum size of a virtual warehouse for self-adaptive virtual warehouse size selection.
TASK_AUTO_MANAGED_TIME_IN_SUSPEND_TO_DROP_WAREHOUSE
  If a virtual warehouse has been suspended in the task warehouse pool for a threshold period of time, then drop the virtual warehouse (e.g., remove from the task warehouse pool).
USER_TASK_MANAGED_DOP_DOWNGRADE_CHECK_ENABLE
  Whether to suggest a smaller size of a virtual warehouse if a DOP (degree of parallelism) downgrade occurred in all jobs of a given task.
USER_TASK_MANAGED_SPILL_CHECK_ENABLE
  Whether to suggest larger virtual warehouse if a spill occurred in all jobs of a given task.

Figure 6:
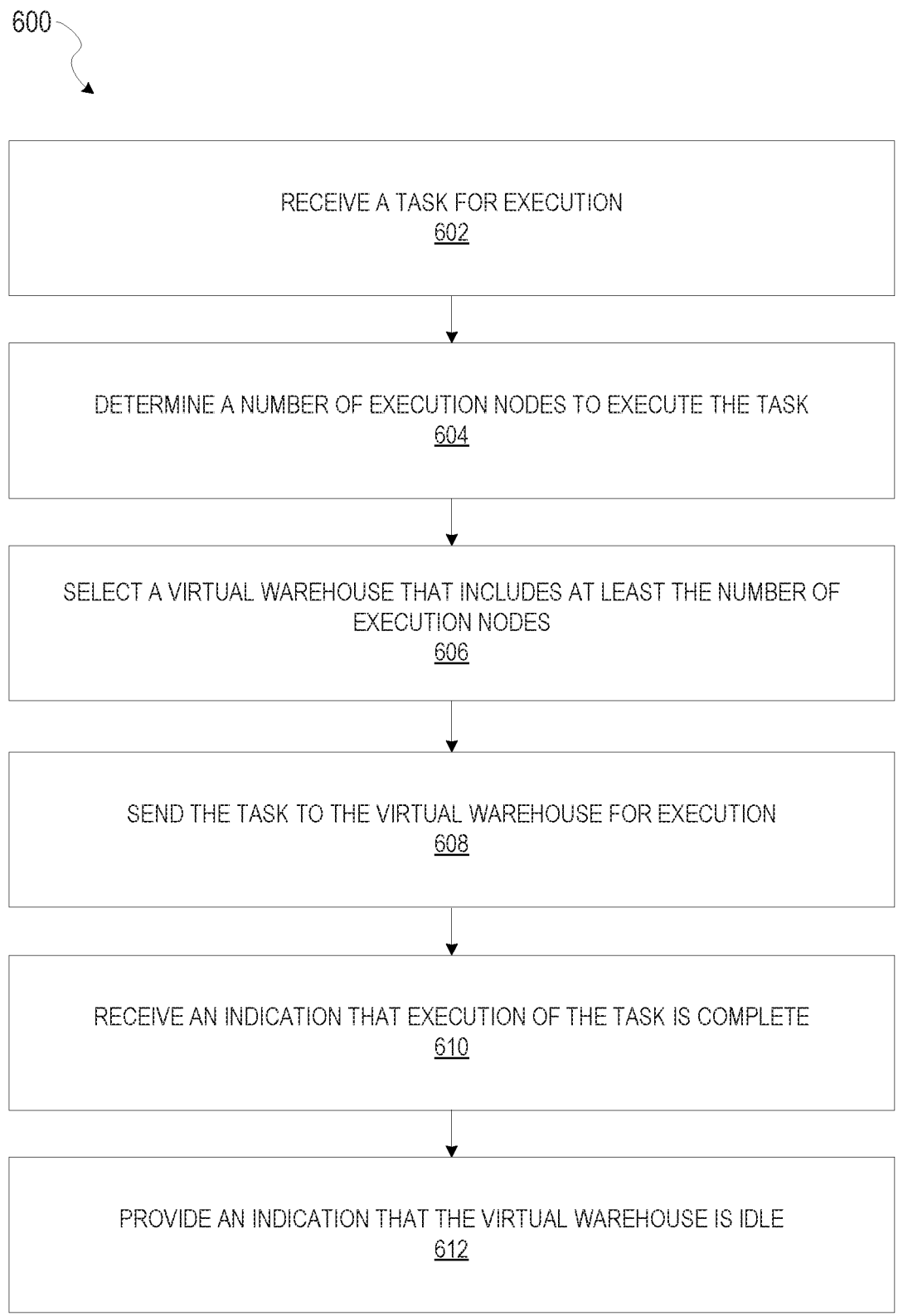
FIG. 6 is a flow diagram illustrating operations of the network-based data warehouse system in performing a method for executing a task, using the task warehouse manager, in accordance with some embodiments of the present disclosure.

FIG. 6 is a flow diagram illustrating operations of the network-based data warehouse system 102 in performing a method 600 for executing a task, using the task warehouse manager 150, in accordance with some embodiments of the present disclosure. The method 600 may be embodied in computer-readable instructions for execution by one or more hardware components (e.g., one or more processors) such that the operations of the method 600 may be performed by components of network-based data warehouse system 102. Accordingly, the method 600 is described below, by way of example with reference thereto. However, it shall be appreciated that the method 600 may be deployed on various other hardware configurations and is not intended to be limited to deployment within the network-based data warehouse system 102.

At operation 602, the task warehouse manager 150 receives a task for execution. As mentioned before, the task warehouse manager 150 scans the queue 124 to determine the task to execute.

At operation 604, the task warehouse manager 150 determines a number of execution nodes to execute the task. In an embodiment, determining the number of execution nodes to execute the task is based at least in part on a history of sizes of virtual warehouses that previously executed a number of tasks. Moreover, each size from the sizes of virtual warehouse corresponds to a number of execution nodes provided in the execution platform 110. A more detailed discussion regarding generating the history of sizes of virtual warehouse, as part of a voting process, is described in FIG. 7 below. Further, as discussed before, when no history of prior executions has been established, the task warehouse manager 150 can assign a default number of execution nodes and/or rely on a user provided hint to determine the number of execution nodes to execute the task.

At operation 606, the task warehouse manager 150, based on the number of execution nodes, selects a virtual warehouse that includes at least the number of execution nodes. In an example, selecting the virtual warehouse is based on whether the virtual warehouse is currently suspended or idle, where an idle virtual warehouse is preferred over another virtual warehouse that is currently suspended. A few other examples are discussed in the ensuing paragraphs.

In an embodiment, the task warehouse manager 150 determines that a pool of virtual warehouses is not available to assign to execute the task (e.g., prior to the pool of virtual warehouse being created and/or all virtual warehouses are not available), generates the pool of virtual warehouses, the pool of virtual warehouse including a particular virtual warehouse, the particular virtual warehouse including a predetermined number of execution nodes, and selects the particular virtual warehouse from the pool of virtual warehouse to execute the task. As mentioned before, each virtual warehouse from the pool of virtual warehouses can have a different number of execution nodes in at least one implementation. Alternatively, the pool of virtual warehouse can include two or more virtual warehouses with equal numbers of execution nodes.

In an embodiment, the task warehouse manager 150 determines that no particular virtual warehouse from a pool of virtual warehouses includes at least the number of execution nodes, generates a new virtual warehouse including at least the number of execution nodes, and selects the new virtual warehouse to execute the task. In this example, the task warehouse manager 150 opts to create a new virtual warehouse to meet the required number of execution nodes to execute the task.

At operation 608, the task warehouse manager 150 sends the task to the virtual warehouse for execution. As mentioned before, in an implementation, this may be accomplished by the task warehouse manager sending the task to the query manager 164, which is responsible for sending a request to the execution platform 110 to execute the task at the assigned virtual warehouse.

At operation 610, the task warehouse manager 150 receives an indication that execution of the task is complete. In an example, the query manager 164 and/or the execution platform 110 provides a notification that the task was able to complete.

At operation 612, the task warehouse manager 150 provides an indication that the virtual warehouse is idle. In an example, the task warehouse manager 150 may simply decide to not suspend the virtual warehouse, and retain the virtual warehouse in the task warehouse pool for future execution of a subsequent task.

Figure 7:
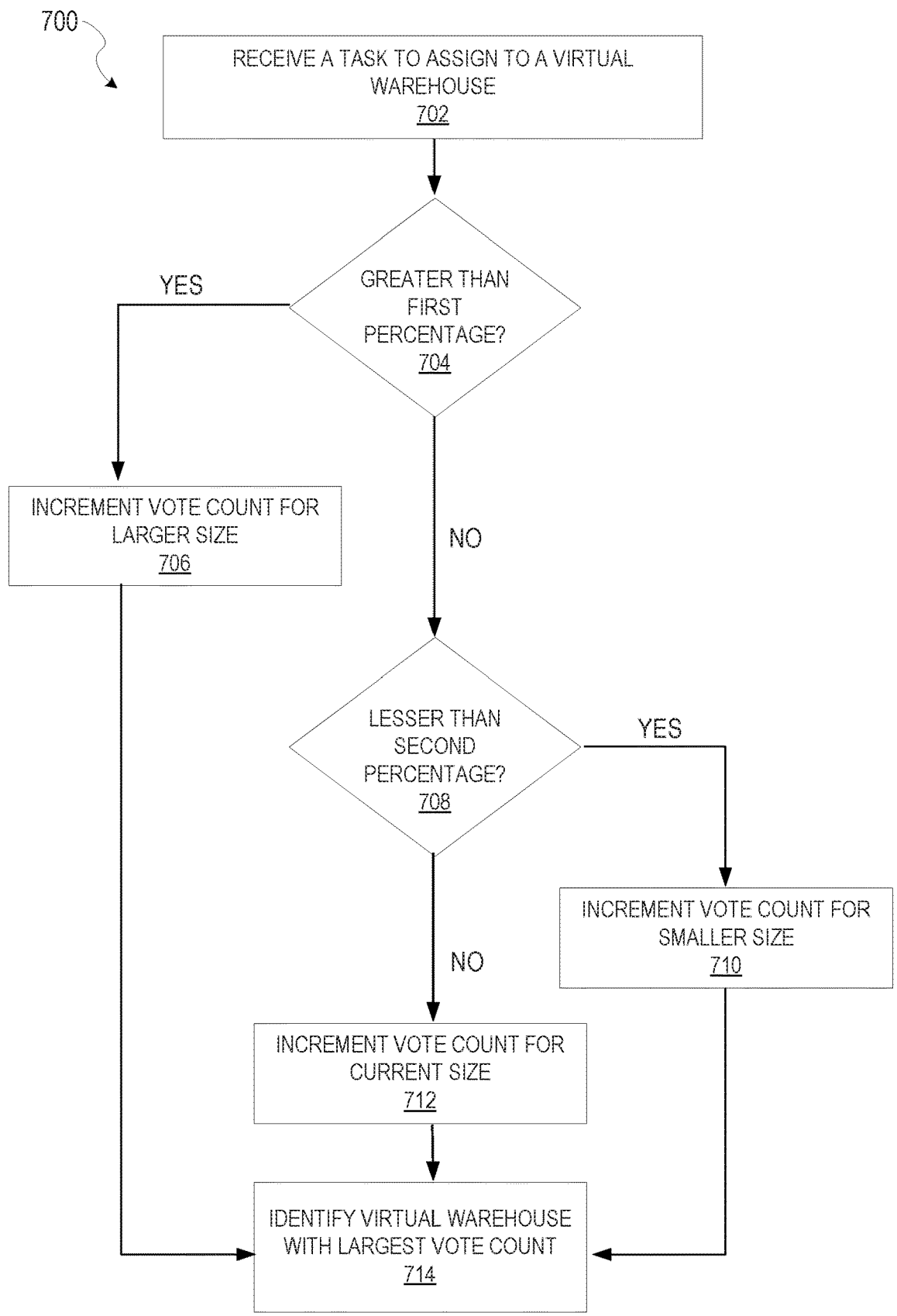
FIG. 7 is a flow diagram illustrating operations of the network-based data warehouse system in performing a method for performing a voting process, using the task warehouse manager, to select a particular virtual warehouse, in accordance with some embodiments of the present disclosure.

FIG. 7 is a flow diagram illustrating operations of the network-based data warehouse system 102 in performing a method for performing a voting process, using the task warehouse manager 150, to select a particular virtual warehouse in accordance with some embodiments of the present disclosure. The method 700 may be embodied in computer-readable instructions for execution by one or more hardware components (e.g., one or more processors) such that the operations of the method 700 may be performed by components of network-based data warehouse system 102. Accordingly, the method 700 is described below, by way of example with reference thereto. However, it shall be appreciated that the method 700 may be deployed on various other hardware configurations and is not intended to be limited to deployment within the network-based data warehouse system 102.

At operation 702, the task warehouse manager 150 receives a task to assign to a virtual warehouse. As mentioned before, the task warehouse manager 150 can determine the task from the queue 124. The task warehouse manager, using a history of prior executions of previous tasks, can perform the following operations to increment a vote count for a virtual warehouse of a corresponding size (e.g., number of execution nodes). As mentioned herein, a vote count can refer to a score or score value corresponding to a respective virtual warehouse, which can be incremented or decremented by the task warehouse manager 150, in which the score is utilized in order to determine a particular virtual warehouse to assign for performing the task.

At operation 704, the task warehouse manager 150 determines whether a previous execution of a prior task was completed in greater than a threshold time period of a time interval (e.g., shown as a first percentage), where the time interval (e.g., the aforementioned task interval) corresponds to a particular period of time for executing a set of tasks.

At operation 706, the task warehouse manager 150 increments a vote count corresponding to a larger size of a virtual warehouse (e.g., than a current size).

At operation 708, if the previous execution of the prior task was not completed in greater than the threshold time, the task warehouse manager 150 determines whether a previous execution of a prior task was completed in lesser than a second threshold time period of a time interval (e.g., shown as a second percentage).

At operation 710, the task warehouse manager 150 increments a vote count corresponding to a smaller size of a virtual warehouse (e.g., than a current size).

At operation 712, if the previous execution of the prior task was not completed in lesser than the second threshold time, the task warehouse manager 150 increments a vote count corresponding to a current size of a virtual warehouse (e.g., a default size or the previous size of the virtual warehouse executing a previous task).

At operation 714, the task warehouse manager 150 identifies a virtual warehouse with a largest vote count. In this manner, the task warehouse manager 150 can select a virtual warehouse from a pool of virtual warehouses based at least in part on vote counts associated with each virtual warehouse from the pool of virtual warehouses.

Figure 8:
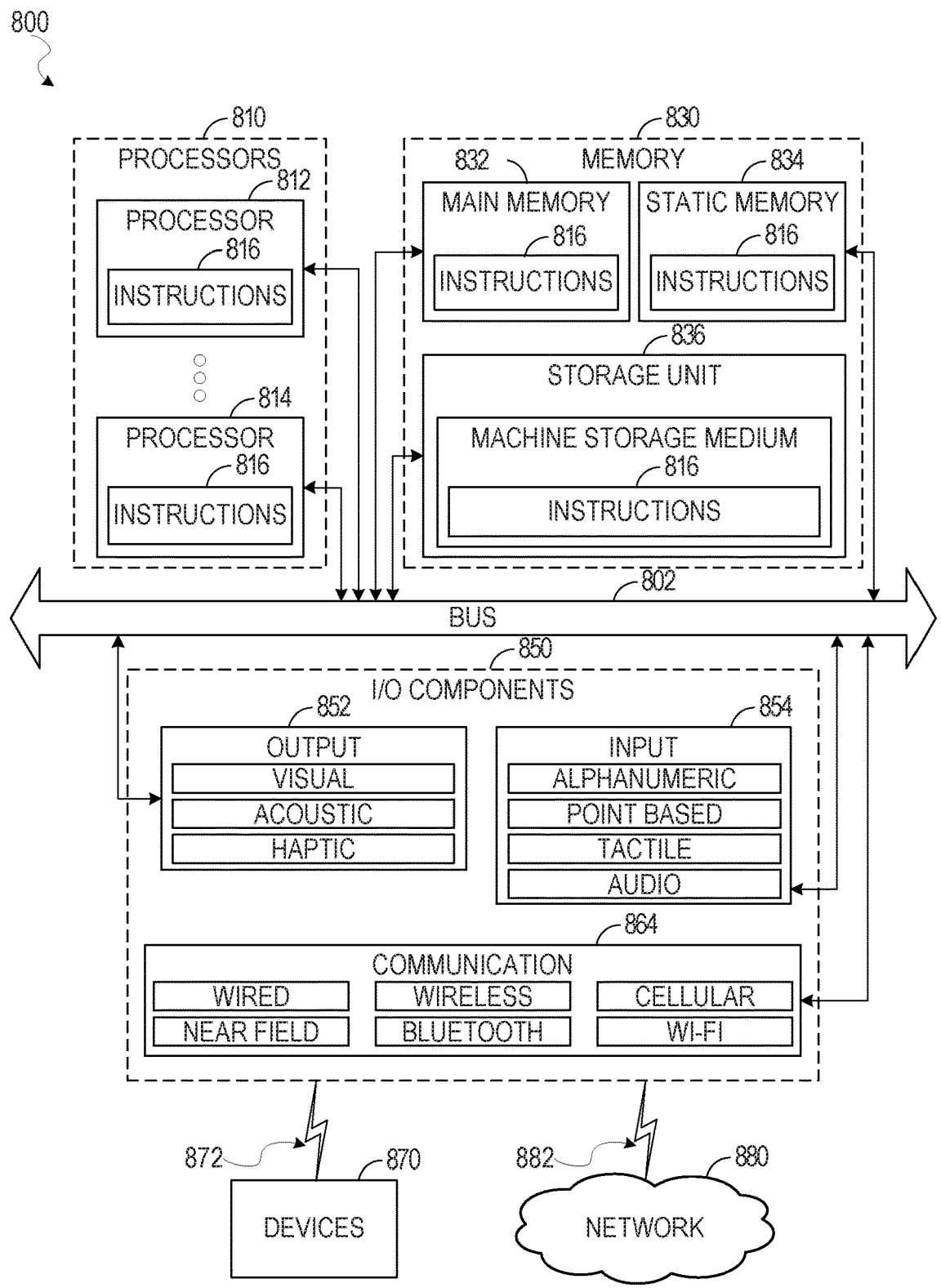
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of any one or more of the methods described above. As another example, the instructions 816 may cause the machine 800 to implement portions of the functionality illustrated in any one or more of FIGS. 1-7. In this way, the instructions 816 transform a general, non-programmed machine into a particular machine 800 (e.g., the compute service manager 108, the execution platform 110, and the user device 112) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the compute service manager 108, the execution platform 110, and the devices 870 may include the user device 112 or any other computing device described herein as being in communication with the network-based data warehouse system 102 or the storage platform 104.

Executable Instructions and Machine Storage Medium

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processors) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 600 and 700 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

EXAMPLES

Example 1 is a network-based data warehouse system comprising: at least one hardware processor; and a memory storing instructions that cause the at least one hardware processor to perform operations comprising: receiving a task for execution; determining a number of execution nodes to execute the task; based on the number of execution nodes, selecting a virtual warehouse that includes at least the number of execution nodes; sending the task to the virtual warehouse for execution; receiving an indication that execution of the task is complete; and providing an indication that the virtual warehouse is idle.

In Example 2 the subject matter of Example 1 wherein determining the number of execution nodes to execute the task is optionally based at least in part on a history of sizes of virtual warehouses that previously executed a number of tasks, each size from the sizes of virtual warehouse corresponding to a number of execution nodes provided in an execution platform.

In Example 3, the subject matter of any one of Examples 1 and 2 wherein selecting the virtual warehouse optionally comprises, determining that a pool of virtual warehouses is not available to assign to execute the task; and generating the pool of virtual warehouses, the pool of virtual warehouse including a particular virtual warehouse, the particular virtual warehouse including a predetermined number of execution nodes; and selecting the particular virtual warehouse from the pool of virtual warehouse to execute the task.

In Example 4, the subject matter of any one of Examples 1-3 wherein selecting the virtual warehouse optionally comprises: determining that no particular virtual warehouse from a pool of virtual warehouses includes at least the number of execution nodes; generating a new virtual warehouse including at least the number of execution nodes; and selecting the new virtual warehouse to execute the task In Example 5, the subject matter of any one of Examples 1-4 wherein each virtual warehouse from the pool of virtual warehouses optionally includes a different number of execution nodes.

In Example 6, the subject matter of any one of Examples 1-5 wherein selecting the virtual warehouse optionally comprises: determining whether a previous execution of a prior task was completed in less than a threshold time period of a time interval, the time interval corresponding to a particular period of time for executing a set of tasks; incrementing a score corresponding to the virtual warehouse; and selecting the virtual warehouse from a pool of virtual warehouses based at least in part on scores associated with each virtual warehouse from the pool of virtual warehouses.

In Example 7, the subject matter of any one of Examples 1-6 wherein the virtual warehouse optionally includes a first number of execution nodes that is smaller than a second number of execution nodes included in a second virtual warehouse associated with the previous execution of the prior task.

In Example 8, the subject matter of any one of Examples 1-7 wherein the virtual warehouse optionally has a score greater than the scores of other virtual warehouses from the pool of virtual warehouses.

In Example 9, the subject matter of any one of Examples 1-8 wherein selecting the virtual warehouse optionally comprises: determining whether a previous execution of a prior task was completed in greater than a threshold time period of a time interval, the time interval corresponding to a particular period of time for executing a set of tasks, incrementing a score corresponding to the virtual warehouse, wherein the virtual warehouse includes a first number of execution nodes that is greater than a second number of execution nodes included in a second virtual warehouse associated with the previous execution of the prior task, and selecting the virtual warehouse from a pool of virtual warehouses based at least in part on scores associated with each virtual warehouse from the pool of virtual warehouses.

In Example 10, the subject matter of any one of Examples 1-9 wherein selecting the virtual warehouse optionally comprises: receiving, using a machine learning model, a set of inputs, the set of inputs including at least information corresponding to the task for execution and a history of prior executions of task; applying, using the machine learning model, a corresponding weight to each of the set of inputs, and providing, using the machine learning model, a size of a particular virtual warehouse to assign for executing the task, the size of the particular virtual warehouse determined based at least in part on the corresponding weight of each of the set of input.

In Example 11, the subject matter of any one of Examples 1-10 wherein selecting the virtual warehouse is optionally based on whether the virtual warehouse is currently suspended or idle.

In Example 12, the subject matter of any one of Examples 1-11 wherein the operations optionally further comprise, prior to the task being completed, determining a second task in the queue based at least in part on a time interval, the time interval corresponding to a subsequent time window for executing a set of tasks; determining that the second task can also be executed by a second virtual warehouse that is currently idle; determining that the second task is unable to be executed by a third virtual warehouse that is currently idle; and suspending the third virtual warehouse.

Example 13 is a method comprising, receiving, using at least one hardware processor, a task for execution; determining, using the at least one hardware processor, a number of execution nodes to execute the task; based on the number of execution nodes, using the at least one hardware processor, selecting a virtual warehouse that includes at least the number of execution nodes; sending, using the at least one hardware processor, the task to the virtual warehouse for execution; receiving, using the at least one hardware processor, an indication that execution of the task is complete; and providing, using the at least one hardware processor, an indication that the virtual warehouse is idle.

In Example 14, the subject matter of Example 13 wherein determining the number of execution nodes to execute the task is optionally based at least in part on a history of sizes of virtual warehouses that previously executed a number of tasks, each size from the sizes of virtual warehouse corresponding to a number of execution nodes provided in an execution platform.

In Example 15, the subject matter of any one of Examples 13-14 wherein selecting the virtual warehouse optionally comprises: determining that a pool of virtual warehouses is not available to assign to execute the task, and generating the pool of virtual warehouses, the pool of virtual warehouse including a particular virtual warehouse, the particular virtual warehouse including a predetermined number of execution nodes; and selecting the particular virtual warehouse from the pool of virtual warehouse to execute the task.

In Example 16, the subject matter of any one of Examples 13-15 wherein selecting the virtual warehouse optionally comprises: determining that no particular virtual warehouse from a pool of virtual warehouses includes at least the number of execution nodes; generating a new virtual warehouse including at least the number of execution nodes, and selecting the new virtual warehouse to execute the task.

In Example 17, the subject matter of any one of Examples 13-16 wherein each virtual warehouse from the pool of virtual warehouses optionally includes a different number of execution nodes.

In Example 18, the subject matter of any one of Examples 13-17 wherein selecting the virtual warehouse optionally comprises: determining whether a previous execution of a prior task was completed in less than a threshold time period of a time interval, the time interval corresponding to a particular period of time for executing a set of tasks; incrementing a score corresponding to the virtual warehouse; and selecting the virtual warehouse from a pool of virtual warehouses based at least in part on scores associated with each virtual warehouse from the pool of virtual warehouses.

In Example 19, the subject matter of any one of Examples 13-18 wherein the virtual warehouse optionally includes a first number of execution nodes that is smaller than a second number of execution nodes included in a second virtual warehouse associated with the previous execution of the prior task.

In Example 20, the subject matter of any one of Examples 13-19 wherein selecting the virtual warehouse optionally comprises: determining whether a previous execution of a prior task was completed in greater than a threshold time period of a time interval, the time interval corresponding to a particular period of time for executing a set of tasks; incrementing a score corresponding to the virtual warehouse, wherein the virtual warehouse includes a first number of execution nodes that is greater than a second number of execution nodes included in a second virtual warehouse associated with the previous execution of the prior task, and selecting the virtual warehouse from a pool of virtual warehouses based at least in part on scores associated with each virtual warehouse from the pool of virtual warehouses.

Example 21 is computer-storage medium comprising instructions that, when executed by a processor, configure the processor to perform operations comprising, receiving a task for executing; determining a number of execution nodes to execute the task; based on the number of execution nodes, selecting a virtual warehouse that includes at least the number of execution nodes, sending the task to the virtual warehouse for execution; receiving an indication that execution of the task is complete; and providing an indication that the virtual warehouse is idle.

In Example 22, the subject matter of Example 21 wherein determining the number of execution nodes to execute the task is optionally based at least in part on a history of sizes of virtual warehouses that previously executed a number of tasks, each size from the sizes of virtual warehouse corresponding to a number of execution nodes provided in an execution platform.

In Example 23, the subject matter of Examples 21-22 wherein selecting the virtual warehouse optionally comprises: determining that a pool of virtual warehouses is not available to assign to execute the task; and generating the pool of virtual warehouses, the pool of virtual warehouse including a particular virtual warehouse, the particular virtual warehouse including a predetermined number of execution nodes, and selecting the particular virtual warehouse from the pool of virtual warehouse to execute the task.

In Example 24, the subject matter of Example 21-23 wherein selecting the virtual warehouse optionally comprises, determining that no particular virtual warehouse from a pool of virtual warehouses includes at least the number of execution nodes, generating a new virtual warehouse including at least the number of execution nodes; and selecting the new virtual warehouse to execute the task.

In Example 25, the subject matter of Example 21-24 wherein each virtual warehouse from the pool of virtual warehouses optionally includes a different number of execution nodes.

In Example 26, the subject matter of Example 21-25 wherein selecting the virtual warehouse optionally comprises, determining whether a previous execution of a prior task was completed in less than a threshold time period of a time interval, the time interval corresponding to a particular period of time for executing a set of tasks; incrementing a score corresponding to the virtual warehouse; and selecting the virtual warehouse from a pool of virtual warehouses based at least in part on scores associated with each virtual warehouse from the pool of virtual warehouses.

In Example 27, the subject matter of Example 21-26 wherein the virtual warehouse optionally includes a first number of execution nodes that is smaller than a second number of execution nodes included in a second virtual warehouse associated with the previous execution of the prior task.

In Example 28, the subject matter of Example 21-27 wherein the virtual warehouse optionally has a score greater than the scores of other virtual warehouses from the pool of virtual warehouses.

In Example 29, the subject matter of Example 21-28 wherein selecting the virtual warehouse optionally comprises: determining whether a previous execution of a prior task was completed in greater than a threshold time period of a time interval, the time interval corresponding to a particular period of time for executing a set of tasks; incrementing a score corresponding to the virtual warehouse, wherein the virtual warehouse includes a first number of execution nodes that is greater than a second number of execution nodes included in a second virtual warehouse associated with the previous execution of the prior task; and selecting the virtual warehouse from a pool of virtual warehouses based at least in part on scores associated with each virtual warehouse from the pool of virtual warehouses.

In Example 30, the subject matter of Example 21-29 wherein the operations further optionally comprise: prior to the task being completed, determining a second task in a queue based at least in part on a time interval, the time interval corresponding to a subsequent time window for executing a set of tasks; determining that the second task can also be executed by a second virtual warehouse that is currently idle; determining that the second task is unable to be executed by a third virtual warehouse that is currently idle, and suspending the third virtual warehouse.

The invention claimed is:

1. A network-based data warehouse system comprising:
at least one hardware processor; and
a memory storing instructions that cause the at least one hardware processor to perform operations comprising:
receiving a task for execution;
determining a number of execution nodes to execute the task;
determining that no virtual warehouse from a pool of virtual warehouses includes at least the number of execution nodes;

generating a new virtual warehouse including at least the number of execution nodes, the new virtual warehouse being different than each virtual warehouse from the pool of virtual warehouses;

selecting the new virtual warehouse to execute the task, the selecting comprising:

determining whether a previous execution of a prior task was completed in less than a threshold time period of a time interval, the time interval corresponding to a particular period of time for executing at least one task, incrementing a score corresponding to a size of a particular virtual warehouse, and selecting the new virtual warehouse from the pool of virtual warehouses based at least in part on the incremented score and the number of execution nodes included in the selected new virtual warehouse; and sending the task to the new virtual warehouse for execution.

2. The network-based data warehouse system of claim 1, wherein determining the number of execution nodes to execute the task is based at least in part on a history of sizes of virtual warehouses that previously executed a number of tasks, each size from the sizes of virtual warehouses corresponding to a number of execution nodes provided in an execution platform, and further comprising:

receiving an indication that execution of the task is complete; and providing an indication that the virtual warehouse is idle.

3. The network-based data warehouse system of claim 1, wherein selecting the new virtual warehouse comprises:

determining that a particular pool of virtual warehouses is not available to assign to execute the task based at least in part on a particular number of execution nodes that are expected to execute the task; and generating a new pool of virtual warehouses, the new pool of virtual warehouses including a particular virtual warehouse, the particular virtual warehouse including a predetermined number of execution nodes; and selecting the particular virtual warehouse from the new pool of virtual warehouses to execute the task.

4. The network-based data warehouse system of claim 1, wherein each virtual warehouse from the pod of virtual warehouses includes a different number of execution nodes.

5. The network-based data warehouse system of claim 1, wherein the new virtual warehouse includes a first number of execution nodes that is smaller than a second number of execution nodes included in a second virtual warehouse associated with the previous execution of the prior task.

6. The network-based data warehouse system of claim 1, wherein the new virtual warehouse has a score greater than scores of other virtual warehouses from the pool of virtual warehouses.

7. The network-based data warehouse system of claim 1, wherein selecting the new virtual warehouse comprises:

determining that a previous execution of a prior task was completed in greater than a threshold time period of the time interval; and incrementing a second score corresponding to a second size of the particular virtual warehouse, wherein the particular virtual warehouse includes a first number of execution nodes that is greater than a second number of execution nodes included in a second virtual warehouse associated with the previous execution of the prior task.

8. The network-based data warehouse system of claim 1, wherein selecting the new virtual warehouse comprises:

receiving, using a machine learning model, a set of inputs, the set of inputs including at least information corresponding to the task for execution and a history of prior executions of task;

applying, using the machine learning model, a corresponding weight to each of the set of inputs; and providing, using the machine learning model, the size of the particular virtual warehouse to assign for executing the task, the size of the particular virtual warehouse determined based at least in part on the corresponding weight of each of the set of input.

9. The network-based data warehouse system of claim 1, wherein selecting the new virtual warehouse is based on whether the virtual warehouse is currently suspended or idle.

10. The network-based data warehouse system of claim 9, wherein the operations further comprise:

prior to the task being completed, determining a second task in a queue based at least in part on a time interval, the time interval corresponding to a subsequent time window for executing a set of tasks;

determining that the second task can also be executed by a second virtual warehouse that is currently idle;

determining that the second task is unable to be executed by a third virtual warehouse that is currently idle; and suspending the third virtual warehouse.

11. A method comprising:

receiving, using at least one hardware processor, a task for execution;

determining, using the at least one hardware processor, a number of execution nodes to execute the task;

determining that no particular virtual warehouse from a pool of virtual warehouses includes at least the number of execution nodes;

generating a new virtual warehouse including at least the number of execution nodes;

selecting the new virtual warehouse to execute the task, the selecting comprising:

determining whether a previous execution of a prior task was completed in less than a threshold time period of a time interval, the time interval corresponding to a particular period of time for executing at least one task, incrementing a score corresponding to a size of a particular virtual warehouse, and selecting the new virtual warehouse from the pool of virtual warehouses based at least in part on the incremented score and the number of execution nodes included in the selected new virtual warehouse; and sending, using the at least one hardware processor, the task to the new virtual warehouse for execution.

12. The method of claim 11, wherein determining the number of execution nodes to execute the task is based at least in part on a history of sizes of virtual warehouses that previously executed a number of tasks, each size from the sizes of virtual warehouses corresponding to a number of execution nodes provided in an execution platform, and further comprising:

receiving an indication that execution of the task is complete; and providing an indication that the new virtual warehouse is idle.

13. The method of claim 11, wherein selecting the new virtual warehouse comprises:

determining that the pool of virtual warehouses is not available to assign to execute the task; and generating the pool of virtual warehouses, the pool of virtual warehouses including a particular virtual warehouse, the particular virtual warehouse including a predetermined number of execution nodes; and selecting the particular virtual warehouse from the pool of virtual warehouses to execute the task.

14. The method of claim 11, wherein each virtual warehouse from the pool of virtual warehouses includes a different number of execution nodes.

15. The method of claim 11, wherein the new virtual warehouse includes a first number of execution nodes that is smaller than a second number of execution nodes included in a second virtual warehouse associated with the previous execution of the prior task.

16. The method of claim 11, wherein selecting the new virtual warehouse comprises:
   determining that a previous execution of a prior task was completed in greater than a threshold time period of the time interval; and
   incrementing a second score corresponding to a second size of the particular virtual warehouse, wherein the particular virtual warehouse includes a first number of execution nodes that is greater than a second number of execution nodes included in a second virtual warehouse associated with the previous execution of the prior task.

17. A computer-storage medium comprising instructions that, when executed by a processor, configure the processor to perform operations comprising:
   receiving a task for executing;
   determining a number of execution nodes to execute the task;
   determining that no particular virtual warehouse from a pool of virtual warehouses includes at least the number of execution nodes;
   generating a new virtual warehouse including at least the number of execution nodes, the new virtual warehouse being different than each virtual warehouse from the pool of virtual warehouses;
   selecting the new virtual warehouse to execute the task, the selecting comprising:
      determining whether a previous execution of a prior task was completed in less than a threshold time period of a time interval, the time interval corresponding to a particular period of time for executing at least one task,
      incrementing a score corresponding to a size of a particular virtual warehouse, and
      selecting the new virtual warehouse from the pool of virtual warehouses based at least in part on the incremented score and the number of execution nodes included in the selected new virtual warehouse; and
   sending the task to the new virtual warehouse for execution.

18. The computer-storage medium of claim 17, wherein determining the number of execution nodes to execute the task is based at least in part on a history of sizes of virtual warehouses that previously executed a number of tasks, each size from the sizes of virtual warehouses corresponding to a number of execution nodes provided in an execution platform, and further comprising:
   receiving an indication that execution of the task is complete; and
   providing an indication that the new virtual warehouse is idle.

19. The computer-storage medium of claim 17, wherein selecting the new virtual warehouse comprises:
   determining that a pool of virtual warehouses is not available to assign to execute the task; and
   generating the pool of virtual warehouses, the pool of virtual warehouse including a particular virtual warehouse, the particular virtual warehouse including a predetermined number of execution nodes; and
   selecting the particular virtual warehouse from the pool of virtual warehouse to execute the task.

20. The computer-storage medium of claim 17, wherein each virtual warehouse from the pool of virtual warehouses includes a different number of execution nodes.

21. The computer-storage medium of claim 17, wherein the new virtual warehouse includes a first number of execution nodes that is smaller than a second number of execution nodes included in a second virtual warehouse associated with the previous execution of the prior task.

22. The computer-storage medium of claim 17, wherein the new virtual warehouse has a score greater than scores of other virtual warehouses from the pool of virtual warehouses.

23. The computer-storage medium of claim 17, wherein selecting the new virtual warehouse comprises:
   determining that a previous execution of a prior task was completed in greater than a threshold time period of the time interval; and
   incrementing a second score corresponding to a second size of the particular virtual warehouse, wherein the particular virtual warehouse includes a first number of execution nodes that is greater than a second number of execution nodes included in a second virtual warehouse associated with the previous execution of the prior task.

24. The computer-storage medium of claim 17, wherein the operations further comprise:
   prior to the task being completed, determining a second task in a queue based at least in part on a time interval, the time interval corresponding to a subsequent time window for executing a set of tasks;
   determining that the second task can also be executed by a second virtual warehouse that is currently idle;
   determining that the second task is unable to be executed by a third virtual warehouse that is currently idle; and
   suspending the third virtual warehouse.

25. The network-based data warehouse system of claim 1, wherein the incremented score is based at least in part on the particular period of time, the particular period of time comprises a window of time to monitor whether a particular task is executed to completion.

26. The network-based data warehouse system of claim 25, wherein incrementing the score corresponding to the size of a particular virtual warehouse comprises further operations comprising:
   determining a percentage of the particular period of time that the particular task is executed to completion by a corresponding virtual warehouse; and
   in response to the percentage of the particular period of time being less than a threshold percentage, incrementing the score, the score indicating a value for reducing a size of a virtual warehouse that will execute a future task, the size of the virtual warehouse corresponding to a particular number of execution nodes used to select a particular virtual warehouse.

* * * * *

UNITED STATES PATENT AND TRADEMARK OFFICE
CERTIFICATE OF CORRECTION

PATENT NO. : 11,048,716 B1
APPLICATION NO. : 16/779128
DATED : June 29, 2021
INVENTOR(S) : Cseri et al.

It is certified that error appears in the above-identified patent and that said Letters Patent is hereby corrected as shown below:

In the Claims

In Column 29, Line 44, in Claim 4, delete "pod" and insert --pool-- therefor

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*